US009484008B2

(12) United States Patent
Goossens et al.

(10) Patent No.: US 9,484,008 B2
(45) Date of Patent: Nov. 1, 2016

(54) METHOD AND APPARATUS FOR DOWN-MIXING OF A MULTI-CHANNEL AUDIO SIGNAL

(71) Applicant: INSTITUT FUR RUNDFUNKTECHNIK GMBH, Munich (DE)

(72) Inventors: Sebastian Goossens, Munich (DE); Jens Groh, Munich (DE); Christian Hartmann, Munich (DE); Jonas Knappe, Lich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 0 days.

(21) Appl. No.: 14/383,009

(22) PCT Filed: Mar. 5, 2013

(86) PCT No.: PCT/EP2013/054336

§ 371 (c)(1),
(2) Date: Sep. 4, 2014

(87) PCT Pub. No.: WO2013/131873

PCT Pub. Date: Sep. 12, 2013

(65) Prior Publication Data

US 2015/0243270 A1 Aug. 27, 2015

(30) Foreign Application Priority Data

Mar. 5, 2012 (IT) .............................. TO2012A0193
Oct. 10, 2012 (IT) .............................. TO2012A0886

(51) Int. Cl.

| | |
|---|---|
| ***H04R 5/00*** | (2006.01) |
| ***H04B 1/00*** | (2006.01) |
| ***H04R 5/02*** | (2006.01) |
| ***G10H 1/18*** | (2006.01) |
| ***H04S 3/00*** | (2006.01) |
| ***H04S 7/00*** | (2006.01) |

(52) U.S. Cl.
CPC ............... *G10H 1/183* (2013.01); *H04S 3/002* (2013.01); *H04S 7/30* (2013.01); *H04S 7/302* (2013.01); *H04S 2400/01* (2013.01); *H04S 2420/01* (2013.01)

(58) Field of Classification Search
None
See application file for complete search history.

(56) References Cited

U.S. PATENT DOCUMENTS

2014/0355767 A1* 12/2014 Virette et al. .................. 381/22

FOREIGN PATENT DOCUMENTS

| | | |
|---|---|---|
| EP | 0 637 191 A2 | 2/1995 |
| EP | 1 777 902 A2 | 4/2007 |
| EP | 1 777 990 A2 | 4/2007 |

OTHER PUBLICATIONS

International Preliminary Report on Patentability and Written Opinion dated Sep. 9, 2014, issued in PCT Application No. PCT/EP2013/054336, filed Mar. 5, 2013.

(Continued)

*Primary Examiner* — Regina N Holder
(74) *Attorney, Agent, or Firm* — Workman Nydegger

(57) ABSTRACT

A method for down-mixing of a m-channel audio signal (L, R, C, Ls, Rs, Rss, Lss) into a n-channel audio signal (Ro, Lo, Rso, Lso), where m is an integer for which holds m>n and n is an integer for which holds n≥2, including the step of generating one of the n-channel audio signals of one side (right or left) of a listener (Ro, Lo, Rso, Lso), by a combination of: a first term including a signal component (R, L, Rs, Ls) of the m-channel audio signal of the same side only, and a second term dependent of m, including one or more of further signal components of the m-channel audio signal (C, Ls, Rs, Rss, Lss) of the same side only, multiplied by at least one respective filtering function (H1, H2, H3, H4, H5, H6, H7, H8), said filtering function being dependent on: a frequency characteristic of the transmission path between the position of the loudspeaker of the respective signal component of the further m-channel audio signal, and a position of the right ear or left ear, respectively, of a listener in an m-channel reproduction situation, and a frequency characteristic of the transmission path between the position of a loudspeaker of the said one of the n-channel audio down-mixed signals, (Ro, Lo, Rso, Lso), and a position of the right ear or left ear, respectively, of a listener in an n-channel reproduction situation.

11 Claims, 7 Drawing Sheets

(56) References Cited

OTHER PUBLICATIONS

Jean-Marc Jot et al., *Binaural Simulation of Complex Acoustic Scenes for Interactive Audio*, Proceedings of the International AES Conference, vol. 121, No. 5, Oct. 2006, pp. 1-20. XP007905995.

Anonymous, *Incredible Multi-Channel Sound*, Research Disclosure, Mason Publications, Hampshire, GB, vol. 427, No. 22, Nov. 1, 1999, 1 page. XP007124995.

Italian Search Report dated Jan. 16, 2013, issued in Italian Application No. TO2012A000886, filed Oct. 10, 2012.

International Search Report dated Apr. 4, 2013, issued in PCT Application No. PCT/EP2013/054336, filed Mar. 5, 2013.

* cited by examiner

METHOD AND APPARATUS FOR DOWN-MIXING OF A MULTI-CHANNEL AUDIO SIGNAL

FIELD OF THE INVENTION

The present invention relates to a method and apparatus for down-mixing of a multi-channel audio signal.

DESCRIPTION OF THE PRIOR ART

Techniques for conversion of multi-channel audio signals into two-channel signals are known, and normally referred to as down-mixing techniques.

With down-mixing it is possible to reproduce an original multi-channel audio signal by a normal stereo equipment with two channels and two loudspeaker cabinets.

An example of a well-known multi-channel audio signal is the so-called surround sound system. Channel surround representation includes, in addition to the two front stereo channels L and R, an additional front center channel C and two surround rear channels Ls, Rs.

Those surround signals are supplied during reproduction to corresponding loudspeakers located in a listening room, for example as shown in FIG. 1, and perceived by a listener positioned at position P1.

As known, the down-mixing of the original surround signals (L, R, C, Ls, Rs) into a stereo signal (Lo, Ro) is made by performing a linear combination of the original signals as for example given by the following formulae:

$$Lo=L+\alpha\cdot C+\beta\cdot Ls$$

$$Ro=R+\alpha\cdot C+\beta\cdot Rs$$

where α and β are constants, smaller than 1, preferably both equal to 0.7.

Each of the two stereo signals Lo, Ro is given by a linear combination of the front and rear signals of the same side, and of the center channel C.

The Lo and Ro signals are supplied to the left and right loudspeaker of a stereo loudspeaker arrangement for reproduction to a listener, see FIG. 2. In this way, a listener positioned at position P2 perceives a (pseudo) surround sensation even if the surround signal is reproduced in down-mixed form by the two loudspeakers Lo and Ro. However by doing so, the listener perceives distortions in the downmixed signal. It should be noted that the publication in the Proceedings of the AES, vol. 121, January 2006, titled 'Binaural simulation of complex acoustic scenes for interactive audio' by Jean-Marc Jot et al. disclose a complicated signal processing system for a binaural simulation of acoustic scenes, which means that a system is proposed where the sound can come from 'specific directions' specifically chosen, such that a 'correct' sensation of a listener that hears the sound via headphones, is obtained. Also a presentation via (two, see FIG. 8, or four, see FIG. 9) loudspeakers is disclosed. It should however be noted that the signal components generated in the above publication of one of the two sides (left or right) always includes a component from the other side (right or left, respectively). Contrary to this, in the present invention, the two sides are completely separated, in that a signal component of one side (left or right) does not comprise a signal component from the other side (right or left, respectively). That means that in the present application, no use is made of transfer functions between a position on the left side and the right ear of the listener, nor of transfer functions between a position on the right side and the left ear of the listener. This makes the signal processing in the system according to the invention more simple, cheaper and faster and less susceptible to variations of the listener's position.

It should further be noted that EP-A177790 disclose a car audio reproduction system for creating a virtual centre sound source by means of a left and right side loudspeaker. Again, the system makes use of transfer functions between a position on the left side and the right ear of the listener, and of transfer functions between a position on the right side and the left ear of the listener. This is again contrary to the present application. Again, the present application discloses the same advantages over the known circuit described in EP-A1777902.

SUMMARY OF THE INVENTION

Therefore it is the main object of the present invention to provide a downmixing method and apparatus which at least partially avoids such distortions.

An object of the present invention is, according to claim 1, a method for down-mixing of a m-channel audio signal (L, R, C, Ls, Rs, Rss, Lss) into a n-channel audio signal (Ro, Lo, Rso, Lso), where m is an integer for which holds m>n and n is an integer for which holds n≥2, comprising the step of generating one of the n-channel audio signals of one side (right or left) of a listener (Ro, Lo, Rso, Lso), by a combination of:

- a first term comprising a signal component (R, L, Rs, Ls) of the m-channel audio signal of the same side only, and
- a second term dependent of m, comprising one or more of further signal components of the m-channel audio signal (C, Ls, Rs, Rss, Lss) of the same side only, multiplied by at least one respective filtering function (H1, H2, H3, H4, H5, H6, H7, H8), said filtering function being dependent on:
  - a frequency characteristic of the transmission path between the position of the loudspeaker of the respective signal component of the further m-channel audio signal, and a position of the right ear or left ear, respectively, of a listener in an m-channel reproduction situation, and
  - a frequency characteristic of the transmission path between the position of a loudspeaker of the said one of the n-channel audio down-mixed signals, (Ro, Lo, Rso, Lso), and a position of the right ear or left ear, respectively, of a listener in an n-channel reproduction situation.

A further object of the present invention is an apparatus, according to claim 2, for down-mixing an m-channel audio signal (L, R, C, Ls, Rs, Rss, Lss) into a n-channel audio signal (Ro, Lo), where m is an integer for which holds m>n and n is an integer for which holds n≥2, comprising

- inputs for receiving the m-channel digital audio signal,
- a down-mixingcircuit for converting the m-channel audio signal into the n-channel stereo audio signal,
- outputs for supplying the n-channel stereo audio signal to respective loudspeakers, characterized in that the down-mixing circuit is provided with means for generating one of the n-channel audio signals of one side (right or left) of a listener (Ro, Lo, Rso, Lso), by a combination of:

- a first term comprising signal component (R, L, Rs, Ls) of the m-channel audio signal of the same side only, and
- a second term dependent of m, comprising one or more of further signal components of the m-channel audio signal (C, Ls, Rs, Rss, Lss) of the same side only, multiplied by at least one respective filtering function (H1, H2, H3, H4, H5, H6, H7, H8) said filtering function being dependent on:

- a frequency characteristic of the transmission path between the position of the loudspeaker of the respective signal component of the further m-channel audio signal, and a position of the right ear or left ear, respectively, of a listener in an m-channel reproduction situation, and
- a frequency characteristic of the transmission path between the position of a loudspeaker of the said one of the n-channel audio down-mixed signals (Ro, Lo, Rso, Lso), and a position of the right ear or left ear, respectively, of a listener in the n-channel reproduction situation.

It should be noted that the definitions in the claims 1 and 2 for the first and second term in the combination, namely, "a first term comprising a signal component of the m-channel audio signal of the same side (left or right, respectively) only", and "a second term dependent of m, comprising one or more of further signal components of the m-channel audio signal of the same side (left or right, respectively) only", mean that the first and second term do not comprise a signal component from the other side (right or left, respectively), as there is a separation between the left and the right side. This however leaves open the possibility that the first or second term comprise a signal component from the front center channel (C). Further objects are apparatuses where m=3, or m=4, or m=5, or m=6, or m=7, and n=2, or n=4, complying with the characteristics of the above defined apparatus.

These and further objects are achieved by means of an apparatus and method for down-mixing of a multi-channel audio signal into a two-channel audio signal, as described in the attached claims, which form an integral part of the present description.

The invention is based on the recognition that combining e.g. the Ls and Rs signal components to e.g. the left-front and the right-front signals, respectively, in the downmixing process, those Ls and Rs signals are now perceived from the "left-front" and right-front" directions, respectively, whereas they are normally (in the five-channel reproduction situation) perceived from the "back-left" and "back right" directions, respectively.

This results in distortions in the perceived downmixed signals, which do not allow the listener to recognize the real physical origin of the sound, that is normally achieved by reproducing the original multi-channel signal with a multi-channel reproduction system. By pre-processing the signals from those positions that are 'lost' in the downmixing process by the pre-filtering as claimed, a relocation can be obtained which improves the perception of the listener, so that the signal components from the positions that are 'lost' in the downmixing process, can at least substantially be perceived from their original position.

BRIEF DESCRIPTION OF THE DRAWINGS

The invention will become fully clear from the following detailed description, given by way of a mere exemplifying and non-limiting example, to be read with reference to the attached drawing figures, wherein.

The same reference numerals and letters in the figures designate the same or functionally equivalent parts.

DETAILED DESCRIPTION OF THE PREFERRED EMBODIMENTS

The method of the present invention aims to correct for the above described distortions, by preprocessing the m-channel signal components before they are combined into the Lo and Ro signals, respectively.

Figure 2:
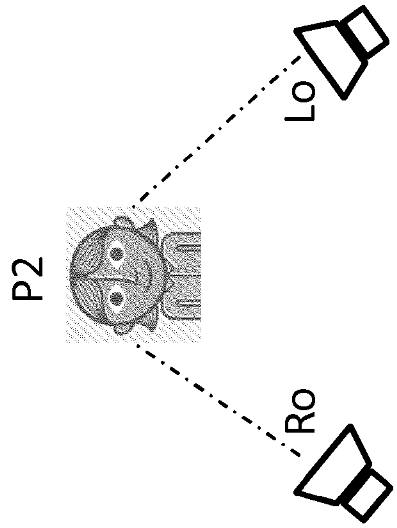
FIG. 2 shows an example of disposition of two loudspeakers for reproduction of a down-mixed two-channel sound signal, with n=2.
Figure 1:
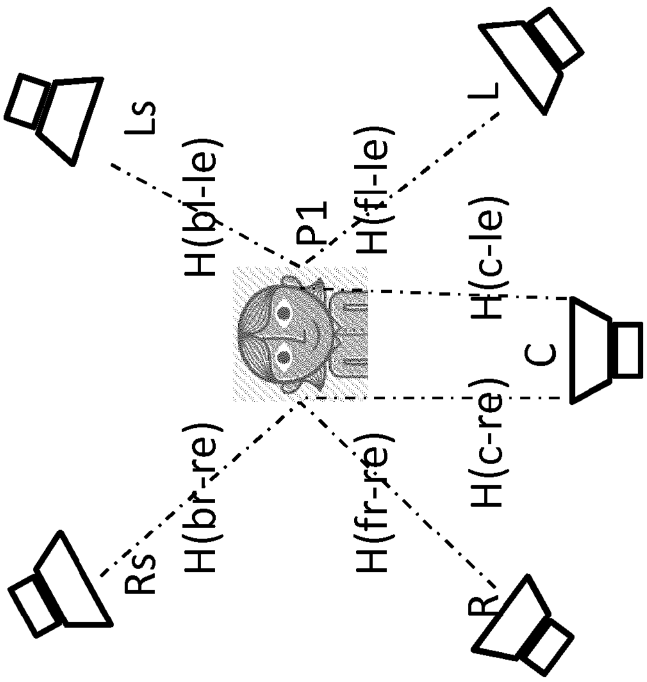
FIG. 1 shows an example of disposition of five loudspeakers for reproduction of a surround sound signal, with m=5.

A typical configuration provides for a situation like the one described above, with reference to FIGS. 1 and 2, where (m=5): L, R, C, Ls and Rs are respectively front left, front right, center, back left and back right components of the multi-channel audio signal, already mentioned above, reproduced by respective loudspeakers.

There are a number of possible situations of presence of different number of channels in the input multi-channel audio signal, namely m=3, where we have the R, L, C signal components; m=4 with R, L, Rs, Ls; m=5 with all L, R, C, Ls and Rs signal components, and so on with higher values of m.

In the following some specific non limiting examples of embodiment of the method of the present invention will be described.

Figure 4:
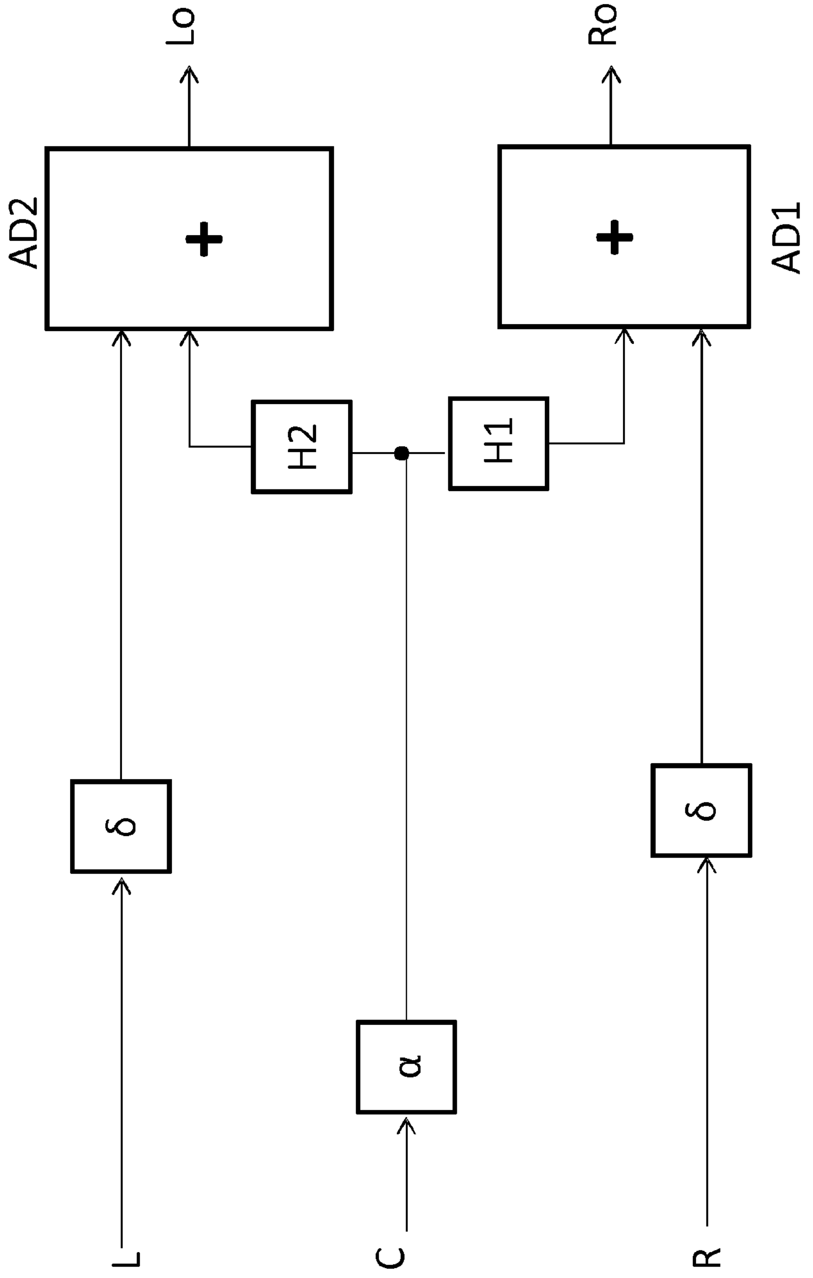
FIGS. 4, 5, 6 and 7 show block diagrams of examples of embodiment of the apparatus according to the invention, in the case of n=2, and respectively n=3, 4, 5 and 7.

A first embodiment of the invention, where m=3 (L, R, C) and n=2 (Lo, Ro), shown in FIG. 4, provides for first H1 and second H2 signal pre-processing of a front-center surround signal component of the m-channel audio signal C prior to down-mixing the m-channel audio signal into the n-channel audio signal. The pre-processing step on the front-center surround signal component C is equivalent to pre-filtering by a first H1 and second H2 filtering function respectively, which at least substantially satisfy the following formulae:

$$H(c-re)=H1*H(fr-re),$$

and $$H(c-le)=H2*H(fl-le)$$

where H(c−re) and H(c−le) are the frequency characteristics of the transmission paths between the position of the front-center loudspeaker and the positions of the right ear and left ear, respectively, of the listener, in an m-channel surround reproduction situation, and H(fr−re) is the frequency characteristic of the transmission path between the position of the "front-right" loudspeaker and the position of the right ear of the listener, in a n-channel stereo reproduction situation, and H(fl−le) is the frequency characteristic of the transmission path between the position of the "front-left" loudspeaker and the position of the left ear of the listener, in a n-channel stereo reproduction situation.

Figure 5:
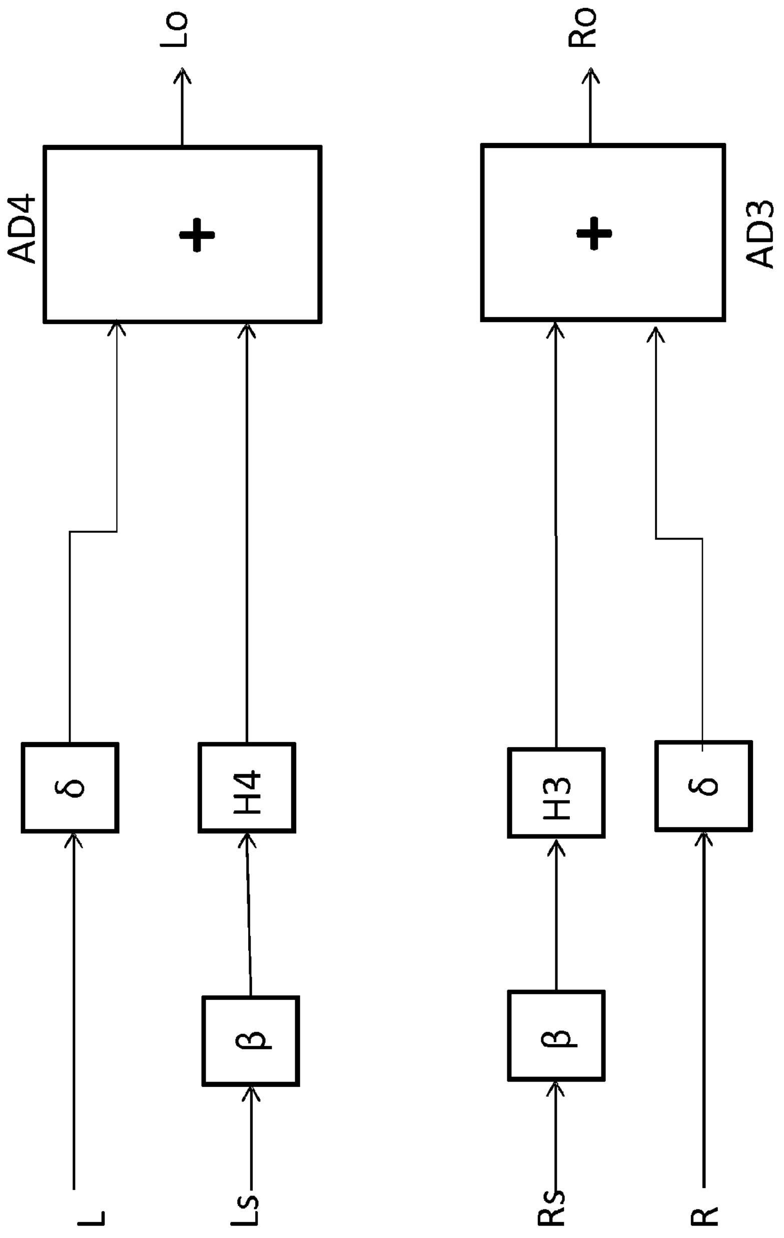

Another embodiment of the invention where m=4 (L, Ls, R, Rs) and n=2 (Lo, Ro) is shown in FIG. 5, and provides for the following preprocessing.

More precisely, the signal Rs is preprocessed by prefiltering Rs by a third filtering function H3, which third filter satisfies the following formula:

$$H(br-re)=H3*H(fr-re)$$

and Ls is preprocessed by prefiltering Ls by a fourth filter H4, which fourth filter satisfies the following formula:

$$H(bl-le)=H4*H(fl-le),$$

where

H(bl−le) is the frequency characteristic of the transmission path between the position of the "back-left" loudspeaker and the position of the left ear of the listener, in the m-channel surround reproduction situation, H(br−re) is the frequency characteristic of the transmission path between the position of the "back-right" loudspeaker and the position of the right ear of the listener, in the m-channel surround reproduction situation, H(fl−le) and H(fr−re) are defined above.

By doing so, the listener may receive the following Rs signal component at its right ear, in case of a stereo reproduction situation (n=2):

$$Rs\cdot H3\cdot\beta\cdot H(fr-re)=Rs\cdot H(br-re)/H(fr-re)\cdot\beta\cdot H(fr-re)=\beta\cdot Rs\cdot H(br-re),$$

which can be what the listener's right ear would have perceived in the m-channel surround reproduction situation (m=5).

Since an exact solution for H3 in general is not feasible or does not exist, an approximation H3' is to be used, where $$H3'\cdot H(fr-re)\approx H(br-re).$$

An equivalent calculation can be of course valid for the perception by the listener's left ear of the Ls signal component.

$$Ls\cdot H4\cdot\beta\cdot H(fl-le)=Ls\cdot H(bl-le)/H(fl-le)\cdot\beta\cdot H(fl-le)=\beta\cdot Ls\cdot H(bl-le),$$

And an equivalent approximation $$H4'\cdot H(fl-le)\approx H(bl-le).$$

Generally, the down-mixing method generates a right hand channel component (Ro) of the n-channel audio signal in the following way:

$$Ro=\delta\cdot R+\beta\cdot \underline{H3}\cdot Rs+A(m)$$

where R is the front right signal component of the m-channel audio signal, δ and β are multiplication factors preferably ≤1, and A(m) an equation dependent of m.

In a similar way the down-mixing unit generates the left hand channel component (Lo) of the n-channel audio signal in the following way:

$$Lo=\delta\cdot L+\beta\cdot H4\cdot Ls+B(m)$$

where L is the front left signal component of the m-channel audio signal, δ and β are multiplication factors preferably ≤1, and B(m) an equation dependent of m.

For m=3 (the embodiment of FIG. 4), the components L, R, C are present, while the components Rs and Ls are not present, therefore we have the following formulae:

$$Ro=\delta\cdot R+\alpha\cdot H1\cdot C$$

$$Lo=\delta\cdot L+\alpha\cdot H2\cdot C$$

where A(m)=α·H1·C and B(m)=α·H2·C, and the contributions relating to Rs and Ls are not present.

For m=4 (the embodiment of FIG. 5), the components L, R, Ls, Rs are present, while the component C is not present, therefore we have A(m)=B(m)=0 in the above formulae of Lo, Ro.

Figure 6:
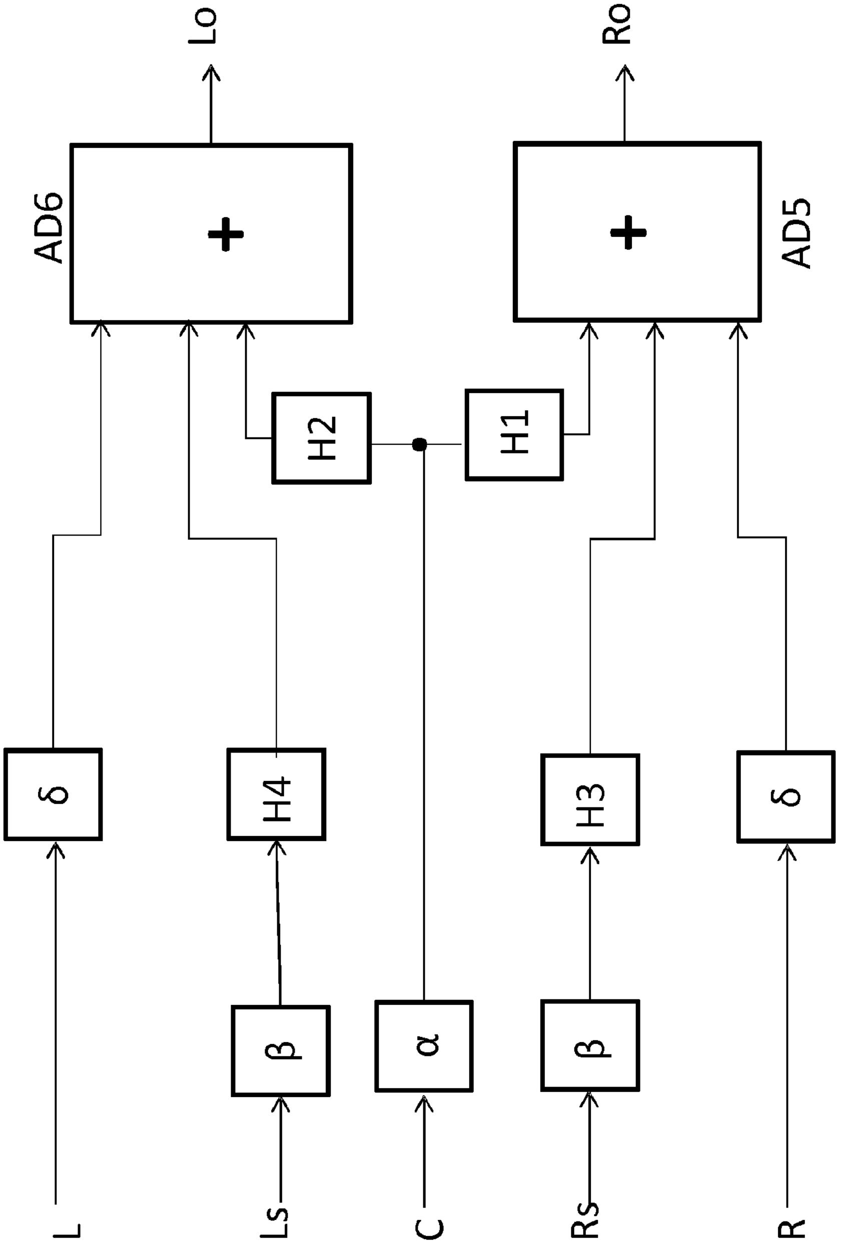

For m=5 (the embodiment of FIG. 6), the components L, R, C, Ls, Rs are present, A(m)=α·H1·C and B(m)=α·H2·C, in the above formulae of Lo, Ro, where C is the above defined center signal component of the m-channel audio signal with m=5, a being a multiplication factor smaller than 1, and H1, H2 are the above defined first and second filters.

Figure 7:
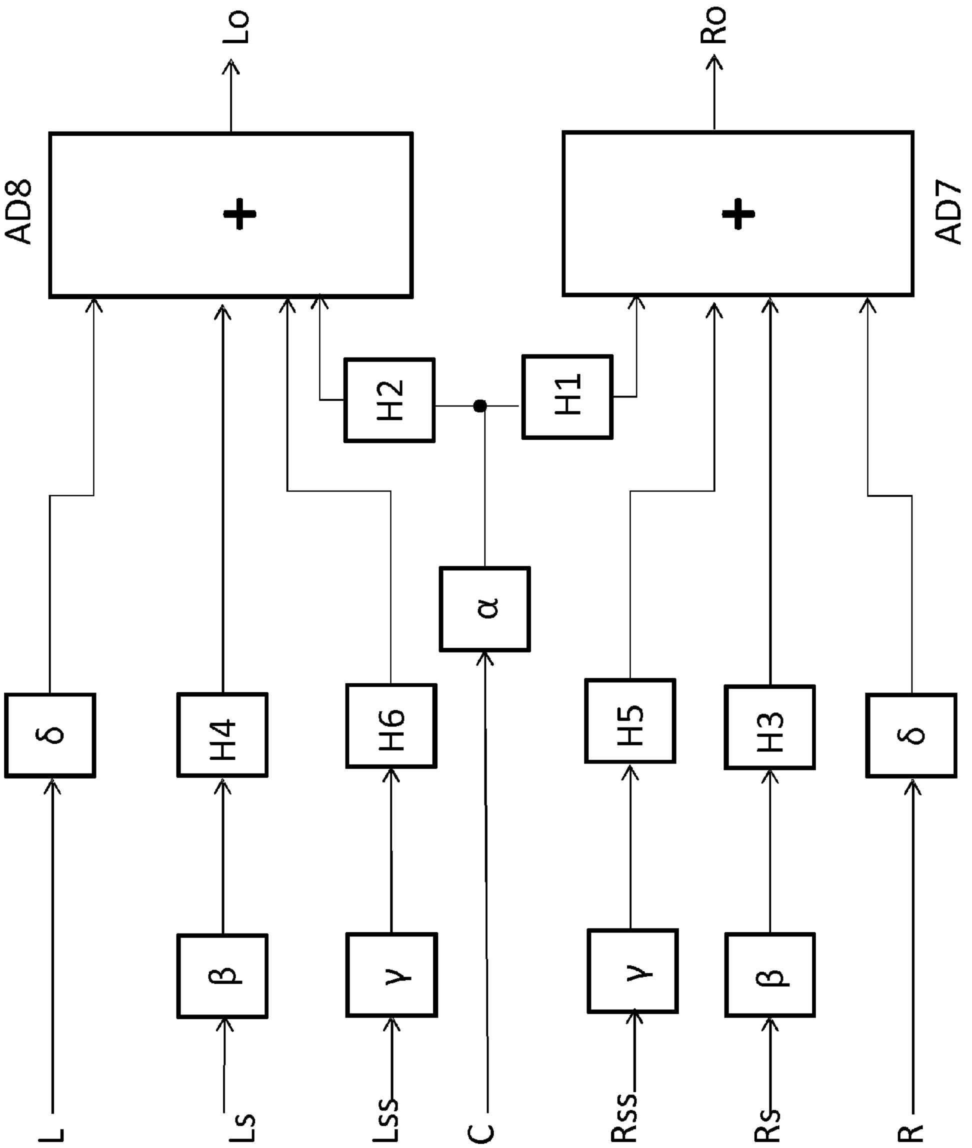

A further embodiment of the method of the invention (see FIG. 7) applies in a situation with an input multi-channel audio signal with m=7 input channels.

Figure 3:
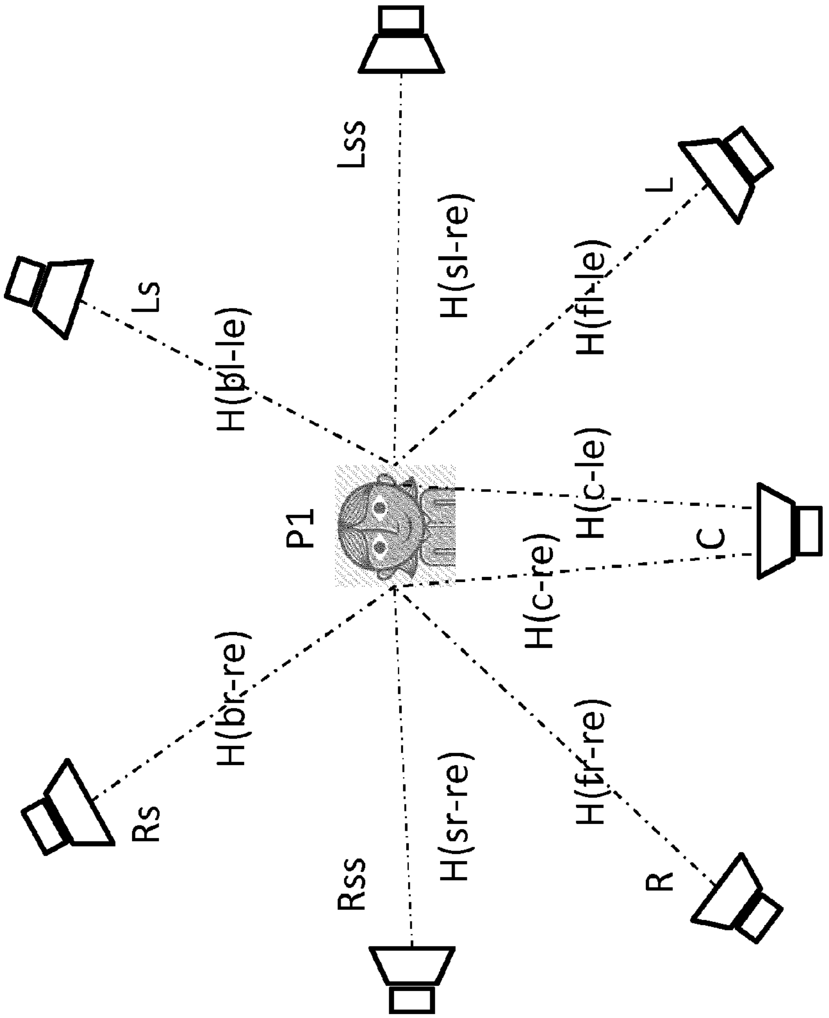
FIG. 3 shows an example of disposition of seven loudspeakers for reproduction of an m-channel sound signal with m=7.

With reference to FIG. 3, in this case we still have the five components of the multi-channel audio signal L, R, C, Ls and Rs, respectively front left, front right, center, back left and back right, like for m=5, plus two additional components given by a right side Rss channel and a left side Lss channel.

In this case of m=7, the method of the invention provides for a fifth signal pre-processing with a filtering function (H5) for pre-processing the side right signal component of the m-channel audio signal (Rss) prior to down-mixing the m-channel audio signal into the n-channel stereo audio signal, the pre-processing step on the side right signal component being equivalent to a pre-filtering step; the filtering function H5 at least substantially satisfies the following formula:

$$H(sr-re)=H5*H(fr-re),$$

where H(sr−re) is the frequency characteristic of the transmission path between the position of the "side-right" loudspeaker Rss and the position of the right ear of the listener, in the seven channel surround reproduction situation, and H(fr−re) is the above defined frequency characteristic of the transmission path between the position of the "front-right" loudspeaker and the position of the right ear of the listener, in a n-channel stereo reproduction situation.

In addition the method of the invention provides for a sixth signal pre-processing with a filtering function (H6) for pre-processing the side left signal component of the m-channel audio signal (Lss) prior to down-mixing the m-channel audio signal into the n-channel stereo audio signal, the pre-processing step on the side left signal component being equivalent to a pre-filtering step; the filtering function H6, at least substantially satisfies the following formula:

$$H(sl-le)=H6*H(fl-le),$$

where H(sl−le) is the frequency characteristic of the transmission path between the position of the "side-left" loudspeaker Lss and the position of the left ear of the listener, in the situation of m=7, and H(fl−le) is the above defined frequency characteristic of the transmission path between the position of the "front-left" loudspeaker and the position of the left ear of the listener, in a n-channel stereo reproduction situation.

In the case of m=7, A(m)=α·H1·C+γ·H5·Rss and B(m)=α·H2·C+γ·H6·Lss.

Figure 8:
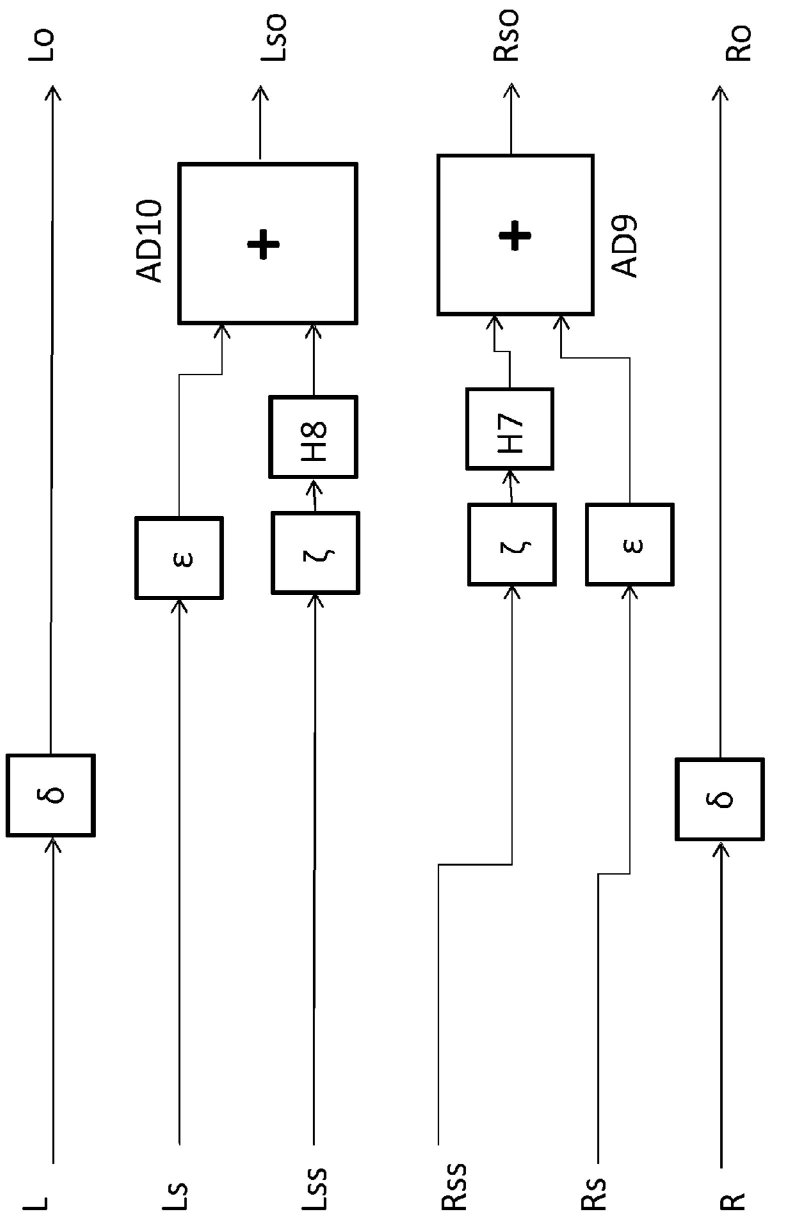
FIG. 8 shows a block diagrams of a further example of embodiment of the apparatus according to the invention, in the case of n=4.

Further embodiments of the method of the invention apply in a situation where the signals of the "side right" signal component and the "side left" signal components of the m-channel audio signal are pre-processed and subsequently combined with the "back right" signal component and the "back left" signal component and fed to the right and left surround loudspeakers of an n-channel audio reproduction arrangement. This is shown in the embodiment of FIG. 8. In these cases, the method of the invention provides for a seventh signal pre-processing with a filtering function (H7) for pre-processing a side right signal component of the m-channel audio signal (Rss) prior to down-mixing the m-channel audio signal into the n-channel audio signal, the pre-processing step on the side right signal component being equivalent to a pre-filtering step; the filtering function H7, at least substantially satisfies the following formula:

$$H(sr-re)=H7*H(br-re),$$

where H(sr−re) is the frequency characteristic of the transmission path between the position of the “side-right” loudspeaker and the position of the right ear of the listener, in an m-channel surround reproduction situation, and H(br−re) is the frequency characteristic of the transmission path between the position of the “back-right” loudspeaker Rso and the position of the right ear of the listener, in an n-channel reproduction situation.

In these cases, the method of the invention provides further for an eighth signal pre-processing with a filtering function (H8) for pre-processing a side left signal component of the m-channel audio signal (Lss) prior to down-mixing the m-channel audio signal into the n-channel audio signal, the pre-processing step on the side left signal component being equivalent to a pre-filtering step; the filtering function H8 at least substantially satisfies the following formula:

$$H(sl-le)=H8*H(bl-le),$$

where H(sl−le) is the frequency characteristic of the transmission path between the position of the “side-left” loudspeaker and the position of the left ear of the listener, in an m-channel surround reproduction situation, and H(bl−le) is the frequency characteristic of the transmission path between the position of the “back-left” loudspeaker Lso and the position of the left ear of the listener, in an n-channel reproduction situation.

In the above cases further components of the n-channel signal are generated, namely:

$$Rso=\epsilon\cdot Rs+\zeta\cdot H7\cdot Rss$$

and $$Lso=\epsilon\cdot Ls+\zeta\cdot H8\cdot Lss,$$

where

Rso is the composite signal applied to back right loudspeaker, Lso is the composite signal applied to the back left loudspeaker, $\epsilon$ and $\zeta$ are multiplication factors, preferably $\leq 1$.

In this case preferably:

$$Ro=\delta\cdot R$$

$$Lo=\delta\cdot L$$

In this embodiment, the downmix is one where the side left- and side right loudspeaker signals are added to back left and back right loudspeakers, respectively. So, suppose m=6 (R, Rs, Rss, L, Ls, Lss), the downmix results in n=4 (R, Rso, L, Lso), as shown in FIG. 8.

In a still further embodiment, starting from the previous embodiment, a further center component C is present in the m-channel signal, which is applied to the Ro and Lo components of the n-channel signal multiplied by the above mentioned coefficients H1, H2 respectively, obtaining:

$$Ro=\delta\cdot R+H1\cdot C;$$

$$Lo=\delta\cdot L+H2\cdot C$$

Generally, the presence of the multiplying factors ($\alpha$, $\beta$, $\delta$, $\eta$, $\gamma$, $\epsilon$, $\zeta$) in the various formulae keeps into account the need to control the global level of sound generated by the down-mixed signal, by reducing proportionally the contributions of the original sound components. Therefore each one of them is set to a value lower than 1.

A preferred way to realize the filter functionality of the filtering functions H1, H2, H3, H4, H5, H6 is by implementing a discrete-time finite-impulse-response (FIR) filter whose filter coefficients are fixed and have been calculated in advance.

The filter coefficients can be derived from the filters' desired impulse responses K1, K2, K3, K4, K5, K6 respectively.

For example, for a non-recursive direct-form filter, the coefficients vector is identical to the impulse response function. K1 and K2 are calculated as described later.

The calculation of K1 is based on transmission path impulse responses K(fr−re) and K(br−re), which are the time-domain counterparts of the corresponding transmission path frequency characteristics H(fr−re), H(br−re).

The same applies to the calculation of K2 based on K(fl−le) and K(bl−le), corresponding to H(fl−le) and H(bl−le), respectively.

The calculation results K1 and K2 are the time-domain counterparts of the filtering functions H1 and H2, respectively.

A common method to determine said transmission path impulse responses is by directly recording them in a measuring setup with a loudspeaker and a microphone, positioned appropriately in a room, preferably an anechoic chamber.

The use of a dummy-head microphone is the common, and in this case preferred, way to obtain head-related impulse responses (HRIR), which are the time-domain counterparts of head-related transfer functions (HRTF).

A preferred method to calculate K1 uses the known concept of least-squares approximation of the linear equation system that expresses the convolution of a filter with an input signal, identified with an output signal.

This method belongs to the concepts also known as inverse filtering or deconvolution and is described in short as follows.

Here applies:

$$K(fr-re)(*)K1=K(br-re),$$

where (*) is the convolution operator (denoting discrete convolution).

When expanded to an equation system in matrix form, the left equation side becomes a Toeplitz matrix formed from K(fr−re), multiplied with a vector, equivalent to K1, and the right equation side is a vector, equivalent to K(br−re).

For this linear equation system, one of the known least-squares approximative solution methods are then performed, for example a singular value decomposition (SVD). This results in a suitable solution for K1.

The same calculation is performed respectively for K2 with:

$$K(fl-le)(*)K2=K(bl-le).$$

As far as some example of apparatus are concerned, for the implementation of the method for conversion of a m-channel audio signal into a n-channel audio signal of the present invention, the following can apply.

In the case of transmission of an original m-channel signal, the method of the invention can be implemented in a consumer audio equipment, suitably modified to include means for the implementation of the method.

With reference to FIGS. 4, 5, 6 and 7, four block diagrams of examples of embodiment of apparatus according to the invention are described, with n=2 and respectively m=3, 4, 5, 7. In FIG. 8 a further example of embodiment is shown where m=6 and n=4.

The method of the present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

Many changes, modifications, variations and other uses and applications of the subject invention will become apparent to those skilled in the art after considering the specification and the accompanying drawings which disclose preferred embodiments thereof.

Further implementation details will not be described, as the man skilled in the art is able to carry out the invention starting from the teaching of the above description.

The invention claimed is:

1. An apparatus for down-mixing an m-channel audio signal into a n-channel audio signal, where m is an integer for which holds m>n and n is an integer for which holds n≥2, comprising inputs for receiving the m-channel digital audio signal, a down-mixing circuit for converting the m-channel audio signal into the n-channel stereo audio signal, outputs for supplying the n-channel stereo audio signal to a plurality of loudspeakers, wherein said down-mixing circuit comprises first and second signal pre-processing units for pre-processing a front-center surround signal component of the m-channel audio signal prior to down-mixing the m-channel audio signal into the n-channel audio signal, the pre-processing steps on the front-center surround signal component being equivalent to first and second pre-filtering functions H1 and H2 respectively, which first and second filtering functions H1 and H2 at least substantially satisfy the following formula:

$$H(c-re)=H1*H(fr-re), \text{ and}$$

$$H(c-le)=H2*H(fl-le)$$

where H(c−re) and H(c−le) are frequency characteristics of transmission paths between the position of the front-center loudspeaker and the positions of the right ear and left ear, respectively, of the listener, in an m-channel surround reproduction situation, and H(fr−re) is a frequency characteristic of a transmission path between the position of the front-right loudspeaker and the position of the right ear of the listener, in an n-channel stereo reproduction situation, and H(fl−le) is the frequency characteristic of the transmission path between the position of the front-left loudspeaker and the position of the left ear of the listener, in an n-channel reproduction situation, the down-mixing circuit further comprises a first signal combination unit for combining a right channel signal component with the front-center channel signal component pre-filtered by said first pre-filtering function, and comprises a second signal combination unit for combining a left channel signal component with the front-center channel signal component pre-filtered by said second pre-filtering function.

2. An apparatus for down-mixing an m-channel audio signal into a n-channel audio signal, where m is an integer for which holds m>n and n is an integer for which holds n≥2, comprising:

inputs for receiving the m-channel digital audio signal, a down-mixing circuit for converting the m-channel audio signal into the n-channel stereo audio signal outputs for supplying the n-channel stereo audio signal to a plurality of loudspeakers, wherein said down-mixing circuit comprises a third and fourth signal pre-processing unit for pre-processing a back right surround signal component and a back-left surround signal component respectively of the m-channel audio signal prior to down-mixing the m-channel audio signal into the n-channel audio signal, the pre-processing step on the back right surround signal component being equivalent to a third pre-filtering function H3, which third filtering function H3 at least substantially satisfies the following formula:

$$H(br-re)=H3*H(fr-re),$$

where H(br−re) is a frequency characteristic of a transmission path between a position of a back-right loudspeaker and a position of the right ear of the listener, in an m-channel surround reproduction situation, and H(fr−re) is the frequency characteristic of a transmission path between a position of a front-right loudspeaker and a position of the right ear of the listener, in an n-channel reproduction situation, the pre-processing step on the back left surround signal component being equivalent to a fourth pre-filtering function H4, which fourth filtering function H4 at least substantially satisfies the following formula:

$$H(bl-le)=H4*H(fl-le)$$

where H(bl−le) is the frequency characteristic of the transmission path between the position of the back-left loudspeaker and the position of the left ear of the listener, in an m-channel surround reproduction situation, and H(fl−le) is the frequency characteristic of the transmission path between the position of the front-left loudspeaker and the position of the left ear of the listener, in an n-channel reproduction situation, the down-mixing circuit further comprises a first signal combination unit for combining a right channel signal component with the back right channel signal component pre-filtered by said third pre-filtering function, and comprises a second signal combination unit for combining a left channel signal component with the back left channel signal component pre-filtered by said fourth pre-filtering function.

3. The apparatus as claimed in claim 2, wherein the down-mixing circuit further comprises a fifth and sixth signal pre-processing unit for pre-processing a side right signal component and a left side signal component, respectively of the m-channel audio signal prior to down-mixing the m-channel audio signal into the n-channel audio signal, the pre-processing step on the side right signal component being equivalent to a fifth pre-filtering function H5, which fifth filtering function H5 at least substantially satisfies the following formula:

$$H(sr-re)=H5*H(fr-re),$$

where H(sr−re) is the frequency characteristic of the transmission path between the position of the side-right loudspeaker and the position of the right ear of the listener, in the m-channel surround reproduction situation, and H(fr−re) is the frequency characteristic of the transmission path between the position of the front-right loudspeaker and the position of the right ear of the listener, in an n-channel reproduction situation, the pre-processing step on the side left signal component being equivalent to a sixth pre-filtering function H6, which sixth filtering function H6 at least substantially satisfies the following formula:

$$H(sl-le)=H6*H(fl-le),$$

where H(sl−le) is the frequency characteristic of the transmission path between the position of the side-left loudspeaker and the position of the left ear of the listener, in the m-channel surround reproduction situation, and H(fl−le) is the frequency characteristic of the transmission path between the position of the front-left loudspeaker and the position of the left ear of the listener, in an n-channel reproduction situation, the side right and side left signal components so prefiltered being applied to said first and second signal combination units, respectively.

4. An apparatus for down-mixing an m-channel audio signal into a n-channel audio signal, where m is an integer for which holds m>n and n is an integer for which holds n≥2, comprising inputs for receiving the m-channel digital audio signal, a down-mixing circuit for converting the m-channel audio signal into the n-channel stereo audio signal, outputs for supplying the n-channel stereo audio signal to a plurality of loudspeakers, wherein said down-mixing circuit comprises a seventh and eighth signal pre-processing unit for pre-processing a side right signal component and a side left signal component, respectively, of the m-channel audio signal prior to down-mixing the m-channel audio signal into the n-channel audio signal, the pre-processing step on the side right signal component being equivalent to a seventh pre-filtering function H7, which seventh filtering function H7 at least substantially satisfies the following formula:

$$H(sr-re)=H7*H(br-re),$$

where H(sr−re) is a frequency characteristic of a transmission path between a position of the "side-right" loudspeaker and a position of the right ear of the listener, in an m-channel surround reproduction situation, and H(br−re) is the frequency characteristic of a transmission path between the position of a back-right loudspeaker and a position of the right ear of the listener, in an n-channel reproduction situation, the pre-processing step on the side left signal component being equivalent to an eighth pre-filtering function H8, which eighth filtering function H8 at least substantially satisfies the following formula:

$$H(sl-le)=H7*H(bl-le),$$

where H(sl−le) is the frequency characteristic of the transmission path between the position of the side-left loudspeaker and the position of the left ear of the listener, in an m-channel surround reproduction situation, and H(bl−le) is the frequency characteristic of the transmission path between the position of the back-left loudspeaker and the position of the left ear of the listener, in an n-channel reproduction situation, the down-mixing circuit further comprises a first signal combination unit for combining the back right channel signal component with the side right channel signal component pre-filtered by said seventh pre-filtering function, and comprises a second signal combination unit for combining a back left channel signal component with the side left channel signal component pre-filtered by said eighth pre-filtering function.

5. The apparatus as claimed in claim 2, wherein the down-mixing circuit is adapted to generate the right hand channel component Ro of the n-channel audio signal in the following way:

$$Ro=\delta\cdot R+\beta\cdot H3\cdot Rs+A(m)$$

where R is the front right signal component of the m-channel audio signal, δ and β are multiplication factors preferably ≤1, and A(m) an equation dependent of m, and wherein the down-mixing unit is adapted to generate the left hand channel component Lo of the n-channel audio signal in the following way:

$$Lo=\delta\cdot L+\beta\cdot H4\cdot Ls+B(m)$$

where L is the front left signal component of the m-channel audio signal, δ and β are multiplication factors preferably ≤1, and B(m) an equation dependent of m.

6. The apparatus as claimed in claim 5, wherein for m=4 and n=2, A(m)=B(m)=0.

7. The apparatus as claimed in claim 5, wherein for m=5 and n=2, A(m)=α H1 C and B(m)=α ·H2·C, where C is the front-center surround signal component of the five-channel audio signal, a being a multiplication factor smaller than 1.

8. The apparatus as claimed in claim 3, wherein for m=7, A(m)=α H1·C+γ ·H5·Rss and B(m)=α ·H2·C+γ ·H6·Lss, α and γ being a multiplication factor smaller than 1, B(m) said equation dependent of m, C said the front-centre surround signal component, Rss and Lss some of said m-channel audio signals.

9. The apparatus as claimed in claim 1, wherein n=2.

10. The apparatus as in claim 4, wherein the down-mixing circuit is adapted to generate a n-channel audio signal comprising a front right Ro, a front left Lo, a rear right Rso and a rear left Lso components, wherein:— Ro=δ·R;

Lo=δ·L;

Rso=ϵ·Rs+ζH7·Rss; and

Lso=ϵ·Ls+ζH8·Lss, and δ, ϵ and ζ being multiplication factors 1.

11. The apparatus as in claim 4, wherein the down-mixing circuit is adapted to generate a n-channel audio signal comprising a front right Ro, a front left Lo, a rear right Rso and a rear left Lso components, wherein:

Ro=δ·R+H1·C;

Lo=δ·L+H2·C;

Rso=ϵ·Rs+ζH7·Rss; and

Lso=ϵ·Ls+ζH8·Lss, and δ, ϵ and ζ being multiplication factors 1.

* * * * *